(12) United States Patent
Monti (10) Patent No.: US 11,447,284 B2
(45) Date of Patent: Sep. 20, 2022

(54) TRANSPORT SYSTEM OF CYLINDRICAL PRODUCTS TO BE LABELLED (71) Applicant: MARCHESINI GROUP S.P.A., Pianoro (IT)

(72) Inventor: Giuseppe Monti, Pianoro (IT)

(73) Assignee: MARCHESINI GROUP S.P.A., Pianoro (IT)

( * ) Notice: Subject to any disclaimer, the term of this patent is extended or adjusted under 35 U.S.C. 154(b) by 353 days.

(21) Appl. No.: 16/769,080

(22) PCT Filed: Nov. 26, 2018

(86) PCT No.: PCT/IB2018/059292
§ 371 (c)(1),
(2) Date: Jun. 2, 2020

(87) PCT Pub. No.: WO2019/116130
PCT Pub. Date: Jun. 20, 2019

(65) Prior Publication Data
US 2021/0078749 A1    Mar. 18, 2021

(30) Foreign Application Priority Data

Dec. 12, 2017   (IT) .................. 102017000142765

(51) Int. Cl.
*B65C 3/12*     (2006.01)
*B65C 9/04*     (2006.01)
(Continued)

(52) U.S. Cl.
CPC ............... *B65C 3/12* (2013.01); *B65C 9/045* (2013.01); *B65G 15/58* (2013.01); *B65G 17/12* (2013.01);
(Continued)

(58) Field of Classification Search
CPC .......... B65C 3/12; B65C 9/045; B65G 15/58; B65G 17/12; B65G 17/24; B65G 37/00;
(Continued)

(56) References Cited

U.S. PATENT DOCUMENTS 2,681,743 A   6/1954 Phin et al.
2,895,589 A * 7/1959 Rostron ................. B65G 47/66
                                                 198/779

(Continued)

FOREIGN PATENT DOCUMENTS

GB           814529 A    6/1959

*Primary Examiner* — Mark A Deuble
(74) *Attorney, Agent, or Firm* — R. Neil Sudol; Henry D. Coleman (57) ABSTRACT

A transport system for cylindrical products to be labelled includes a first conveyor and a second conveyor. The first conveyor has pairs of support members for supporting the cylindrical products, which are predisposed parallel to one another and mutually distanced so as to identify a free space between them. The second conveyor is a looped conveyor having an upper branch and arranged with the free space present between the pairs of support members and comprises pairs of idle rollers which, when moving along the upper branch, are interposed with each support member pair. The upper branch has an ascending portion so that the rollers can abut the products transported by the support member pairs and raise the products from the housings so that the products are supported only by idle rollers when they transit at an abutting means of a label applicator.

6 Claims, 9 Drawing Sheets

(51) Int. Cl.
*B65G 15/58* (2006.01)
*B65G 17/12* (2006.01)
*B65G 37/00* (2006.01)
*B65G 17/24* (2006.01)
*B65G 47/244* (2006.01)

(52) U.S. Cl.
CPC ............ *B65G 17/24* (2013.01); *B65G 37/00* (2013.01); *B65G 47/244* (2013.01); *B65G 2201/0214* (2013.01); *B65G 2207/14* (2013.01); *B65G 2812/02683* (2013.01)

(58) Field of Classification Search
CPC .......... B65G 47/244; B65G 2201/0214; B65G 2207/14; B65G 2812/02683; B65G 2812/02138
USPC .................................... 198/779, 377.01, 416
See application file for complete search history.

(56) References Cited

U.S. PATENT DOCUMENTS

| | | | | |
|---|---|---|---|---|
| 3,988,182 | A * | 10/1976 | Urso | ........................ B65C 9/065 198/380 |
| 4,428,474 | A * | 1/1984 | Gau | ........................ B65C 9/067 198/377.07 |
| 4,726,898 | A * | 2/1988 | Mills | ...................... B65G 47/24 209/939 |
| 4,981,205 | A * | 1/1991 | Cowlin | ................ B65G 47/252 198/387 |
| 6,691,854 | B1 * | 2/2004 | De Greef | ................ B65B 35/58 198/377.01 |
| 8,016,538 | B2 * | 9/2011 | Monti | ...................... B65B 1/46 141/168 |
| 9,723,952 | B2 * | 8/2017 | Janecka | ................. B65G 17/24 |

* cited by examiner

TRANSPORT SYSTEM OF CYLINDRICAL PRODUCTS TO BE LABELLED

FIELD OF THE INVENTION

The present invention relates to the technical sector regarding the application of labels on products having a cylindrical shape or a portion of lateral surface that has a cylindrical shape.

For application of labels on this type of product it is necessary, once the label is positioned on the lateral cylindrical surface, or portion, of the product, to rotate the product about the axis thereof in such a way that the label can be folded and made to completely adhere to the product.

DESCRIPTION OF THE PRIOR ART

In this regard, a known method comprises transferring the products along an advancement direction so that the products are arranged with the axis thereof transversal to the advancement direction, and so that the products transit, one following another, below a label application device.

The device for applying the labels comprises a supply station of the labels which is predisposed to unpeel, i.e. remove the label from the relative support film, and apply the label on the transiting product.

Once the label has been applied on the product, the product must be advanced in such a way as to transit at an abutment element, constituted for example by a loop-wound belt, and at the same time rotated about the axis thereof, in such a way that the label can be folded, and can adhere, about the cylindrical lateral surface of the product.

For this purpose, a product transport system is known, comprising a movement organ, for example constituted by a loop-wound belt or strap activatable for transport and advancement of the products in an advancement direction that is such as to cause the products to transit below the device for applying the labels.

The transport system comprises a series of pairs of rollers which are mounted idle on relative support members which are predisposed on the movement organ in such a way that the rollers are arranged transversally thereto and have the axis thereof arranged transversally to the advancement direction of the products.

Each pair of rollers is disposed to receive between the rollers a relative product so that the product is arranged with the axis thereof arranged transversally to the advancement direction.

In this way the products, once a label has been applied thereon, transit below the abutting means (belt) and, as they interfere with the abutting means, rotate about the axis thereof due to idle rollers that support them, so that the label can be folded and adhered about the cylindrical lateral surface or about the cylindrical portion of the lateral surface of the product.

This type of transport system however has a series of drawbacks.

Firstly, the movement organ, on which the support members and the pairs of rollers are predisposed, must have a quite significant extension as it must have an initial part that is situated adjacent to a loading station at which the products to be labelled are positioned between the pairs of rollers, a part situated at the device for applying the labels and a final part situated adjacent to an unloading station at which the labelled products are picked up to be transferred to other operating stations for packaging thereof or for carrying out other operations thereon.

This means having to use a large number of support members and a large number of rollers.

This leads to a considerable increase in the size of the whole transport system and, therefore, also relative activation issues.

Further, in a case of format change of the products to be labelled, it will be necessary to proceed to the replacement of the support members with other support members having a mounting interaxis of the rollers that is different and corresponding to the different dimensions (diameter) of the products.

This operation, apart from requiring a machine down time that is significantly long, with consequent repercussions on productivity, inevitably leads to the need to have available a large number of support members of different types, and thus significant costs for supply thereof.

SUMMARY OF THE INVENTION

The aim of the present invention is therefore to provide a new transport system for transporting cylindrical products to be labelled products that is able to obviate the above-mentioned drawbacks.

In particular, an aim of the present invention is to provide a new transport system for cylindrical products to be labelled which is easily adaptable to product format change, requiring a very short machine down-time, without doubt significantly shorter than with the transport system of known type, and at the same time enabling a relevant saving in terms of costs.

A further aim of the present invention is to provide a transport system of cylindrical products to be labelled which is overall easy to manoeuvre and activate, and not particularly heavy.

The above aims are attained according to a transport system of cylindrical products to be labelled according to claim 1.

Other advantageous aspects of the transport system of the present invention are set out in the dependent claims.

BRIEF DESCRIPTION OF THE DRAWINGS

The characteristics of a preferred embodiment of the transport system of cylindrical products to be labelled will be described in the following description with reference to the appended tables of drawings, in which.

FIGS. from 7A to 7I illustrate respective schematic views of a succession of operating steps which take place during the transit of a product below the device for applying labels.

DESCRIPTION OF THE PREFERRED EMBODIMENTS

With reference to the accompanying tables of drawings, reference numeral (100) denotes the transport system of cylindrical products (P) to be labelled of the present invention.

The transport system (100) is predisposed to transport products (P) substantially having a cylindrical shape, with a cylindrical lateral surface, or a cylindrical portion of lateral surface, on which a label is to be applied, reporting identification data regarding the product.

The transport system (100) of the invention is therefore predisposed to receive the products (P) to be labelled, to transport the products (P) and to cause the products (P) to transit at a device (D) for applying labels which, in a known way, comprises supply means (D1) for supplying and applying a label on the products (P) and abutting means (D2) for abutting the products (P) on which the label has been applied.

The transport system (100) of the invention comprises, in combination, a first conveyor means (1) and a second conveyor means (2): the peculiarities of the transport system (100) of the invention consist in the special structure of the first conveyor means (1) and the second conveyor means (2) e and in the reciprocal arrangement thereof with respect to the device (D) for applying labels.

In particular, the first conveyor means (1) comprises pairs (11) of support members (12, 13) for supporting the cylindrical products (P) to be labelled and is predisposed and configured so as to have a conveyor portion (T) along which the pairs (11) of support members (12, 13) are moved according to an advancement direction (W) so as to cause the pairs (11) of support members to transit at the device (D) for applying labels.

The support members (12, 13) of each pair (11) of support members are predisposed parallel to one another and mutually distanced so as to identify a free space (S) between them.

Further, the support members (12, 13) are conformed in such a way as to have respective V-shaped housings (120, 130) defining a seating for restingly receiving a corresponding cylindrical product (P) so that it can be arranged with the relative axis transversal with respect to the advancement direction (W).

In this way, the product (P) can transit with the cylindrical lateral surface thereof, or a portion of the cylindrical lateral surface thereof, below the device (D) for applying labels so that the supply means (D1) can supply and apply a label on a part of the cylindrical lateral surface or a portion of cylindrical lateral surface.

Figure 2:
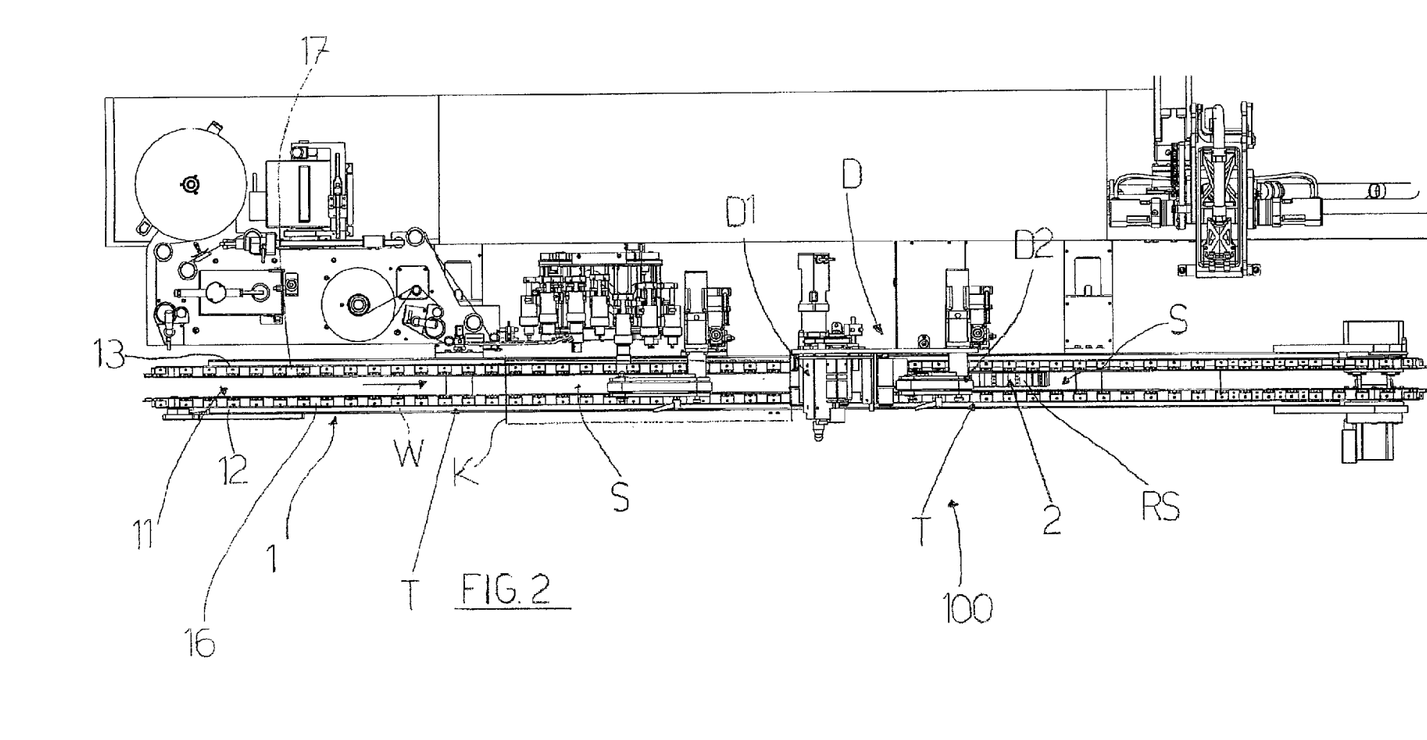
FIG. 2 schematically illustrates a plan view of the transport system of FIG. 1.
Figure 3:
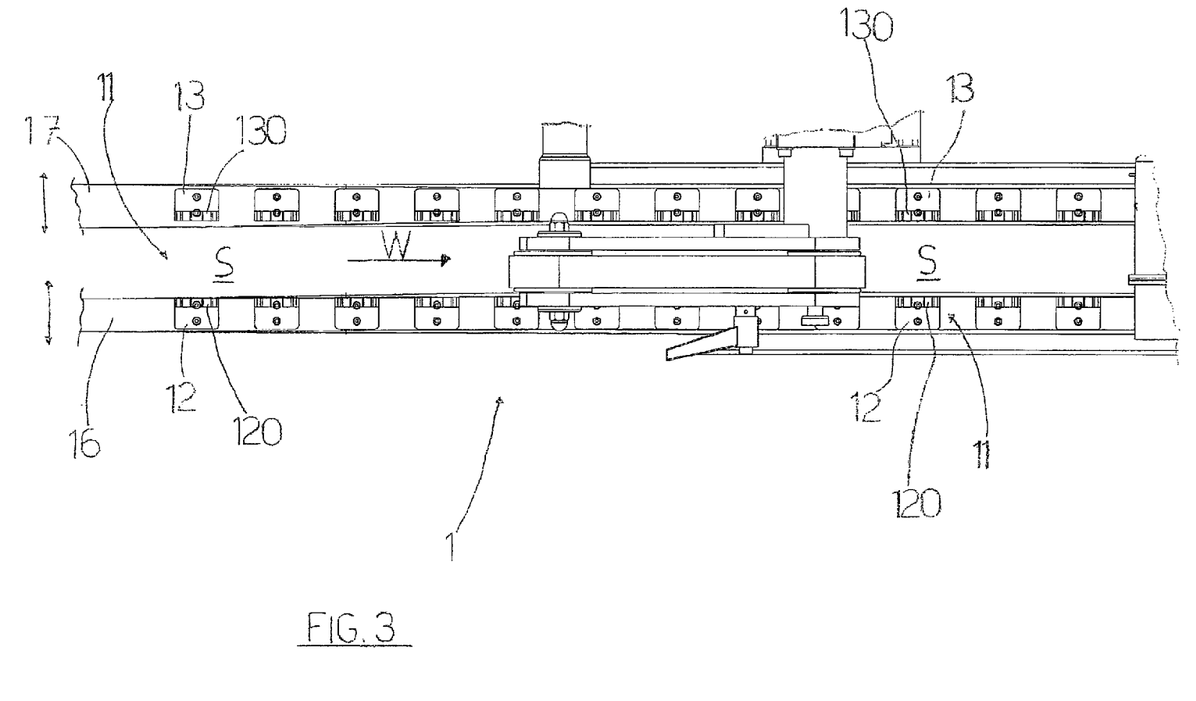
FIG. 3 is a view of detail K of FIG. 2 in larger scale.
Figure 4:
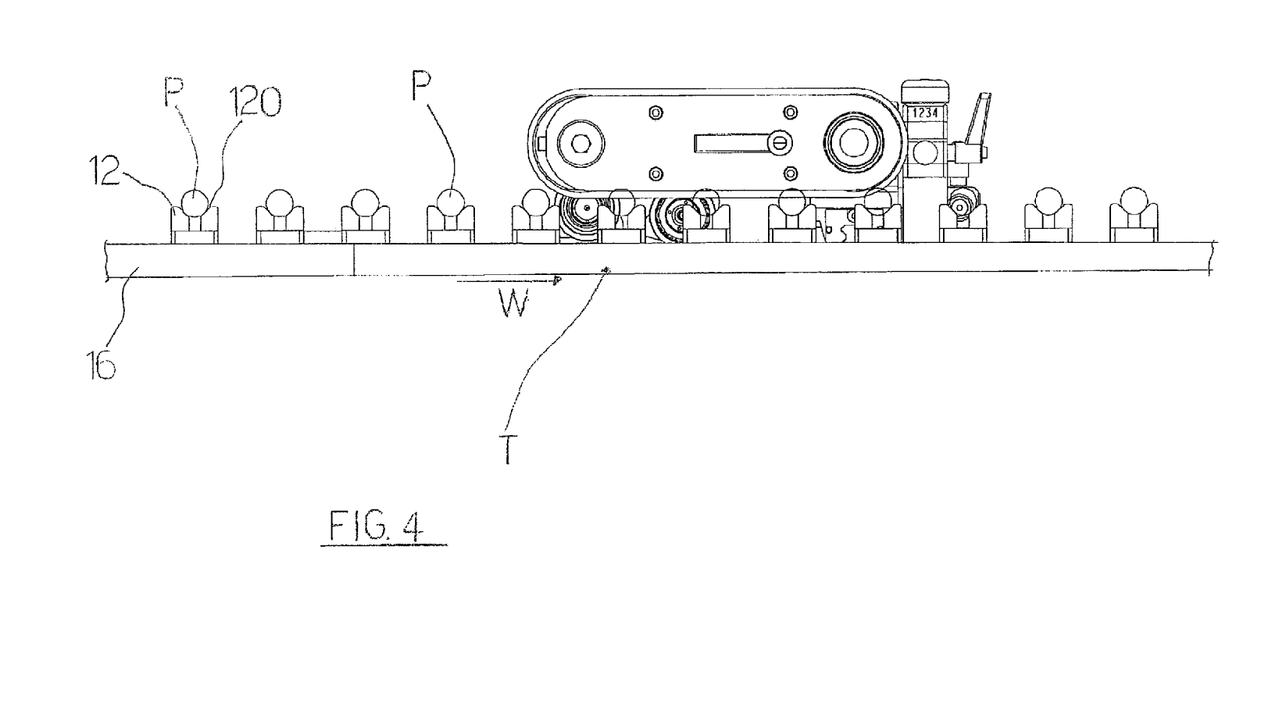
FIG. 4 is a lateral view of the detail of FIG. 3.

The second conveyor means (2) is a looped conveyor organ having an upper branch (RS) and is arranged with respect to the first conveyor means (1) in such a way that an upper branch (RS) is situated at the free space (S) present between the pairs (11) of support members (12, 13) and positioned below the abutting means (D2) of the device (D) for applying the labels (see for example FIG. 2).

The second conveyor means (2) comprises pairs (21) of idle rollers (22, 23) (visible in detail in FIGS. 5 and 6) and is activatable in such a way that the pairs (21) of idle rollers (22, 23) are movable along the upper branch (RS) according to a movement direction (Z) in the advancement direction (W) of the pairs (11) of support members (12, 13) and with the relative axis arranged transversally to the movement direction (Z) and so that each pair (21) of idle rollers (22, 23) is interposed with each pair (11) of the support members (12, 13) and advances in synchrony therewith.

In particular, the second conveyor means (2) is configured and predisposed in such a way that the upper branch (RS) has an ascending portion (A) that is conformed with respect to the conveyor portion (T) of the first conveyor means (1) in such a way that the rollers (22, 23) of the pairs (21) of rollers moving along the ascending portion (A) can abut the products (P) transported by the pairs (11) of the support members (12, 13), on which the label has been applied, and can raise the products (P) from the housings (120, 130) of the support members (12, 13) (see in particular the sequence of figures from 7A to 7F).

In this way, owing to the combination of the special characteristics described in the foregoing, the products (P) will be supported only by the idle rollers (22, 23) when the products (P) transit at the abutting means (D2) of the device (D) for applying the labels.

Consequently the products resting only on the idle rollers abut the abutting means and will rotate about the relative axes and the label can be folded and adhered to the cylindrical lateral surface, or portion of cylindrical lateral surface, of the products.

The advantages obtained with the transport system of the invention are clear.

Firstly, the support members (12, 13) of the pairs (11) of support members of the first conveyor means (1) are suitable for being able to receive and transport cylindrical products (P) of different dimensions, i.e. different diameter, as they are provided with V-shaped housings (120, 130), in which products can be housed unproblematically even where there is a significant difference of diameter among them.

Further, the support members (12, 13) with a V-shaped housing (120, 130) are certainly less heavy than a corresponding number of pairs of rollers and, consequently, it is possible to predispose a first conveyor means (1) with a significant extension and length, so that it can easily be used and activated to receive the products from a loading station, and transport them in transit below the device for applying labels towards an unloading station, or other types of work stations.

Lastly, but not of least importance, a further significant advantage, consists in the fact that the second conveyor means (2) can be designed so as to have a limited extension, and in particular so as to have an extension of the upper branch (RS) substantially corresponding to the extension of the zone in which the device for applying labels operates.

In this way, the number of pairs (21) of idle rollers (22, 23) to be used will certainly be modest and limited: this leads to various and undoubted advantages.

Primarily, in a case of product format-change, the number of pairs of idle rollers which will need to be replaced will certainly not be excessive, and without a doubt significantly lower than the transport systems of known type, and thus with a considerable reduction in costs.

Further, the machine down-time will be very short, with small if not indeed insignificant repercussions on productivity.

Lastly, the overall weight of the second conveyor means will not be very relevant or, consequently, it might be activated and movable without undue issues or requirements.

Further advantageous aspects of the transport system proposed by the present invention are described in the following.

Figure 7A:
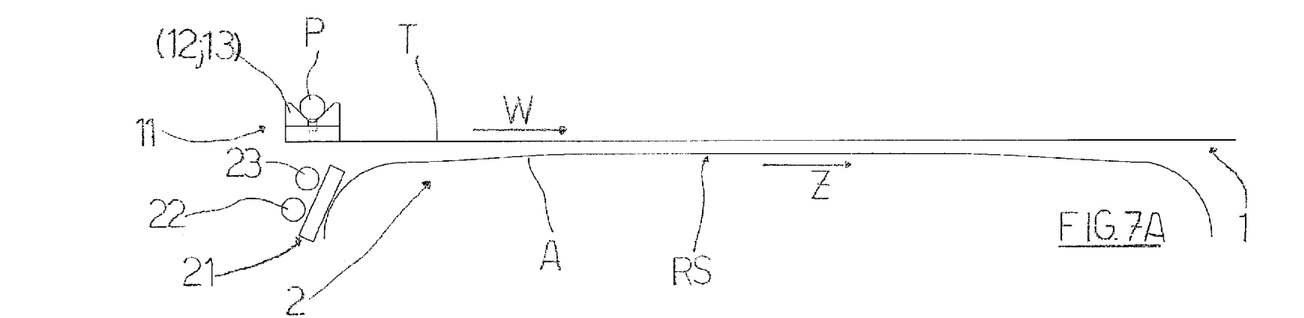
Figure 7B:
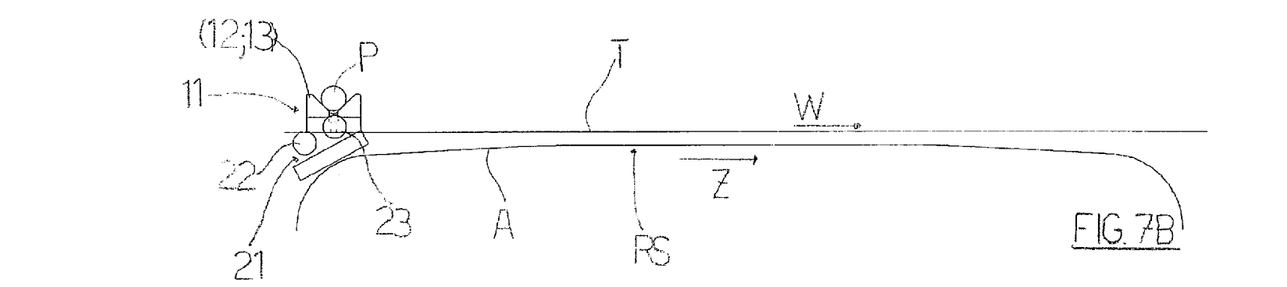
Figure 7C:
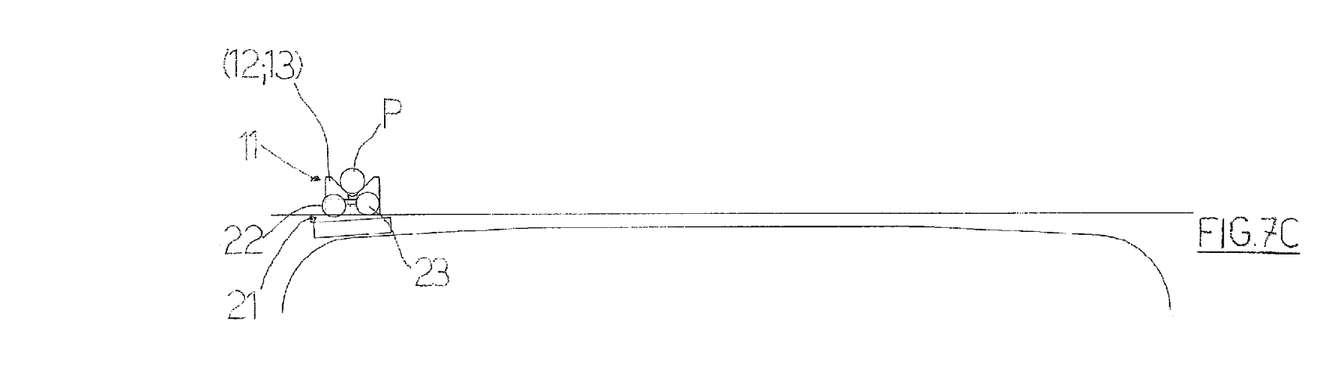
Figure 7D:
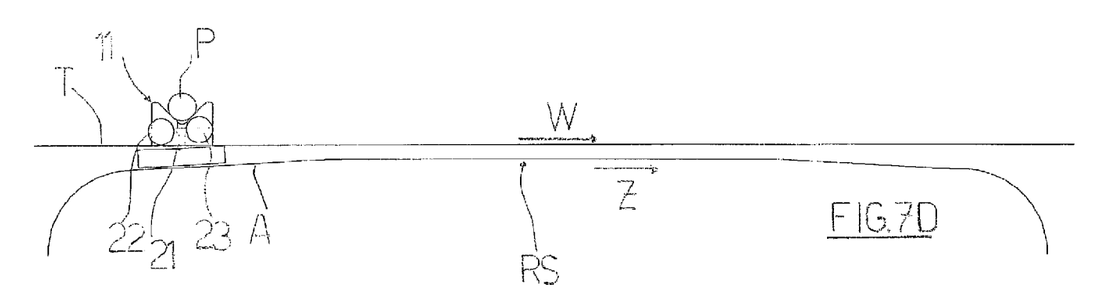
Figure 7E:
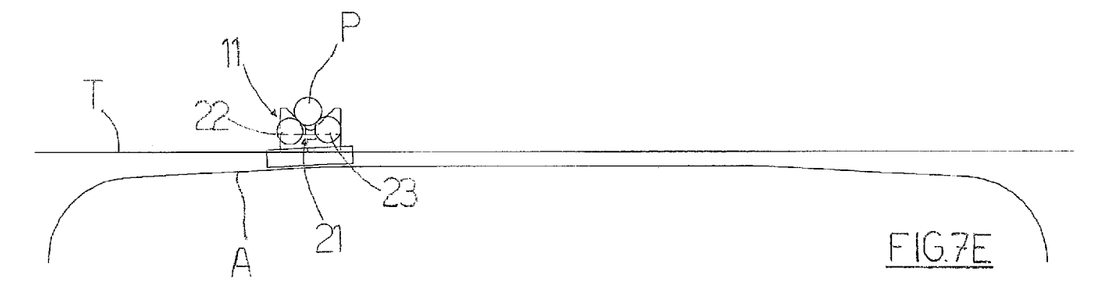
Figure 7F:
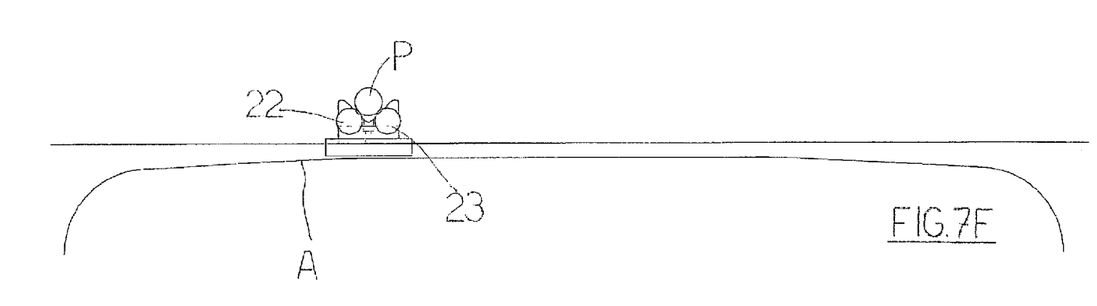
Figure 7G:
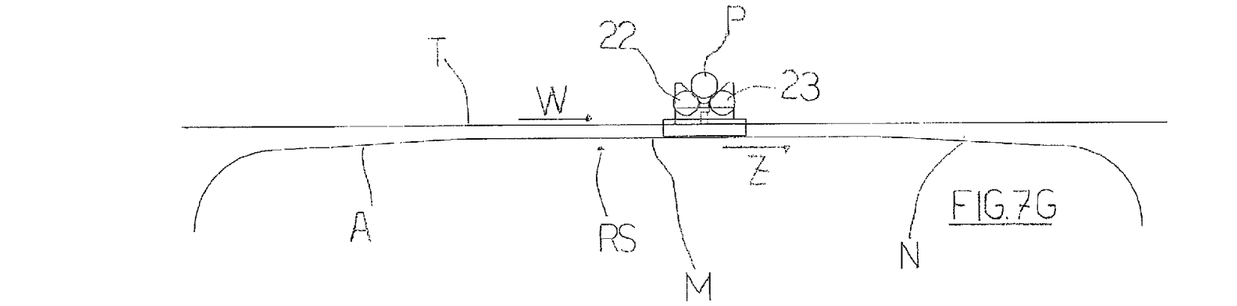
Figure 7H:
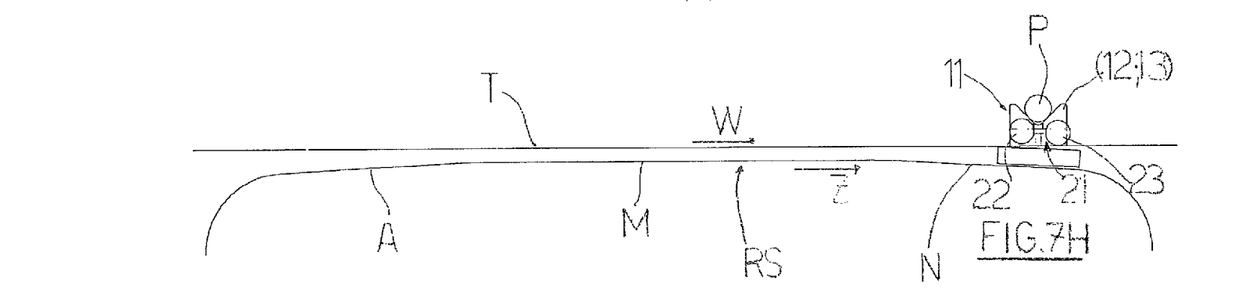
Figure 7I:
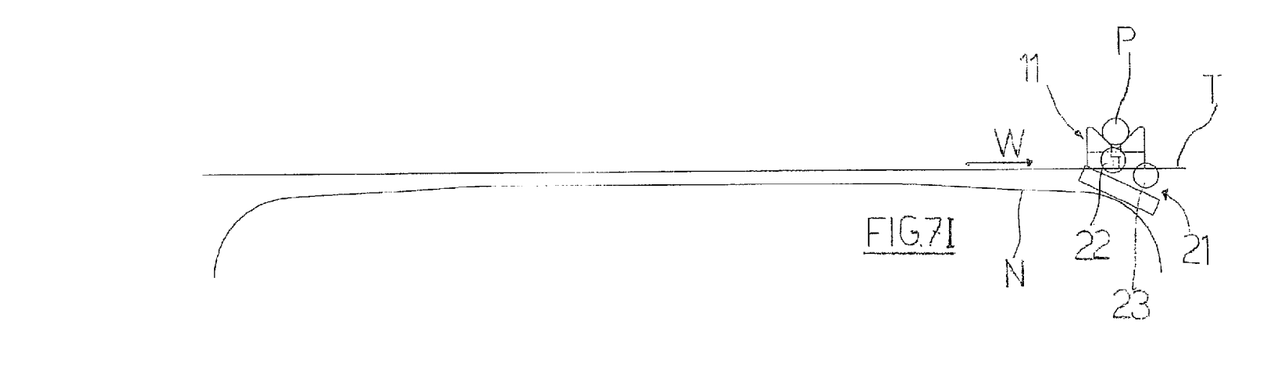

The upper branch (RS) of the second conveyor means (2) can further be conformed in such a way as further to have a straight portion (M) arranged consecutively to the ascending portion (A), which straight portion (M) has an extension at most equal to the extension of the abutting means (D2) of the device (D) for applying the labels, and a descending portion (N) consecutive to the straight portion (M) and which is conformed with respect to the conveyor portion (T) of the first conveyor means (1) in such a way that the rollers (22, 23) of the pairs of rollers (21) following the descending portion (N) can return the products (P) on which the label has been applied, to rest in the housings (120, 130) of the support members (12, 13) (see for example the sequence in figures from 7G to 7I).

Figure 1:
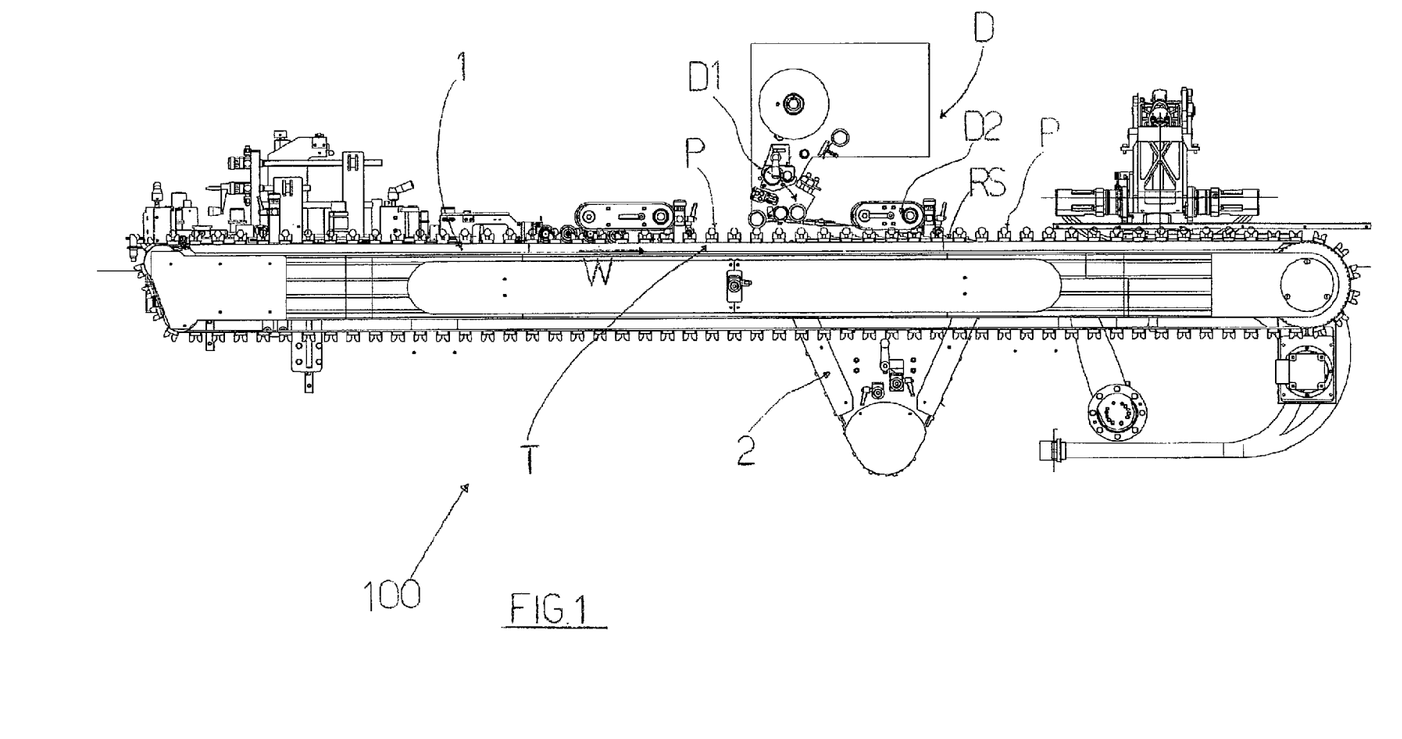
FIG. 1 schematically illustrates a frontal view of the transport system of cylindrical products to be labelled, object of the present invention, the transport system which is illustrated in the use position thereof, i.e. associated to at least a device for applying labels (D) comprising an application station (D1) of the labels and an abutting means (D2) of the products on which the label has been applied.

In this way the presence of the straight portion (M), along which the idle rollers supporting the products are advanced, facilitates the folding of the label when the products abut and interfere with the abutting means (D2) of the device (D) for applying the labels which is usually constituted by a lower branch of a loop-wound belt, which lower branch is arranged parallel to the advancement direction of the products, and thus parallel to the straight portion (M) and, for example, activatable in an opposite direction (see for example FIG. 1).

The second conveyor means (2) can be made in such a way that it is constituted by a belt movement member (20) loop-wound on relative pulleys (28), of which at least one pulley is a drive pulley.

In this case, in order to obtain the above-mentioned ascending (A), straight (M) and descending (N) portions, corresponding profiled members can be used, appropriately shaped to guide and impose the desired path and slope on the belt (20).

For example, according to the illustrated preferred shape in the appended figures, the second conveyor means can comprise three pulleys, and thus the belt movement member can have a triangular shape.

It is however possible also to use a different number of pulleys and thus have a different enveloping embodiment of the belt movement member, while however still keeping an upper branch (RS) positioned between the pairs of support members of the first conveyor means and at the position of the device for applying the labels, in particular below the abutting means.

Figure 5:
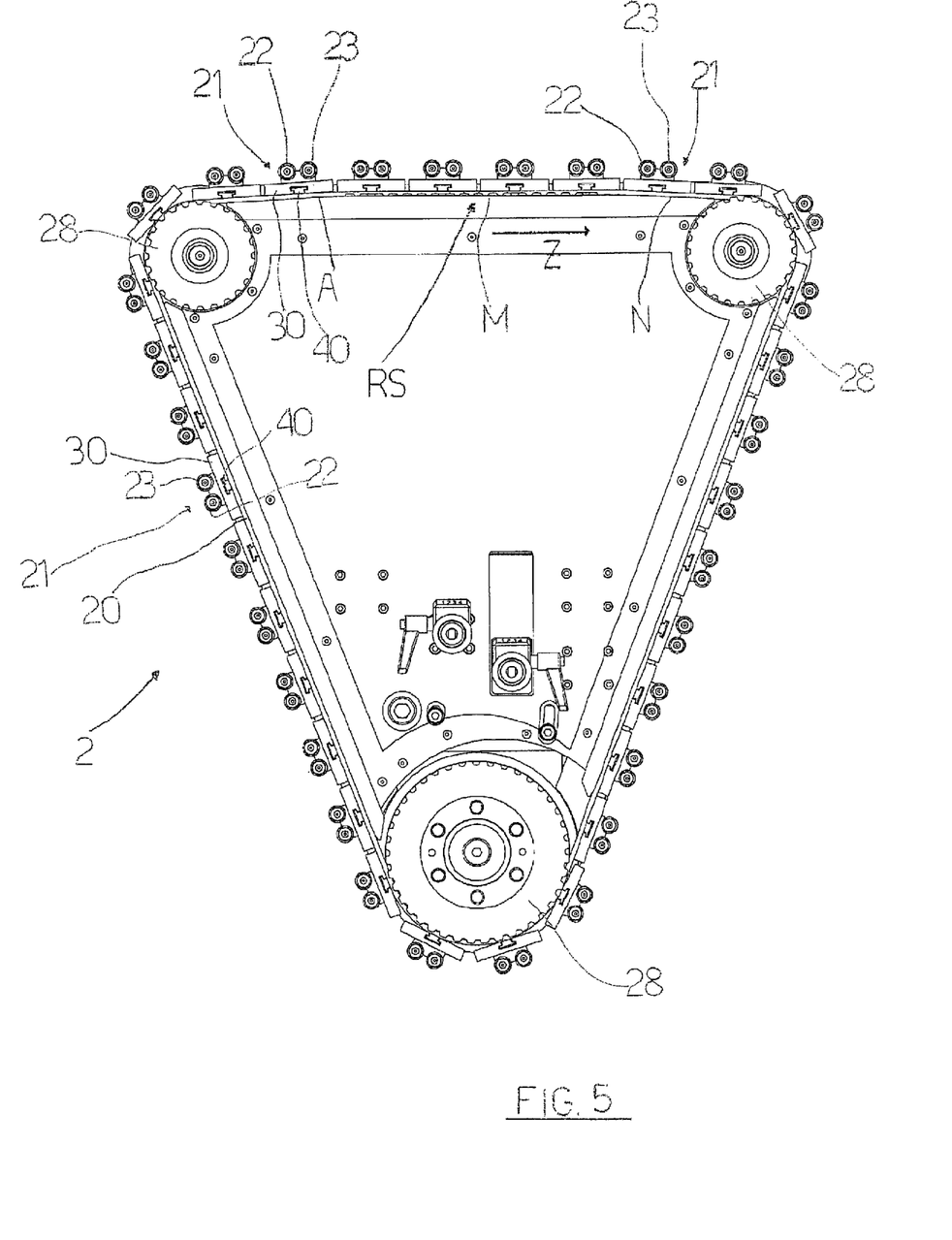
FIG. 5 schematically illustrates a frontal view of a particularly significant component of the transport system of the invention.

The pairs (21) of idle rollers (22, 23) are mounted on respective support frames (30) while the belt movement member (20) comprises rapid engaging/disengaging members (40) predisposed and configured for enabling the engaging and disengaging of the support frames (30) of the pairs (21) of idle rollers (22, 23) (see for example FIG. 5).

In this way, it will be easy to replace the pairs of rollers with other pairs of rollers having a different interaxis between them, in a case where there is a format change of the products.

Figure 6:
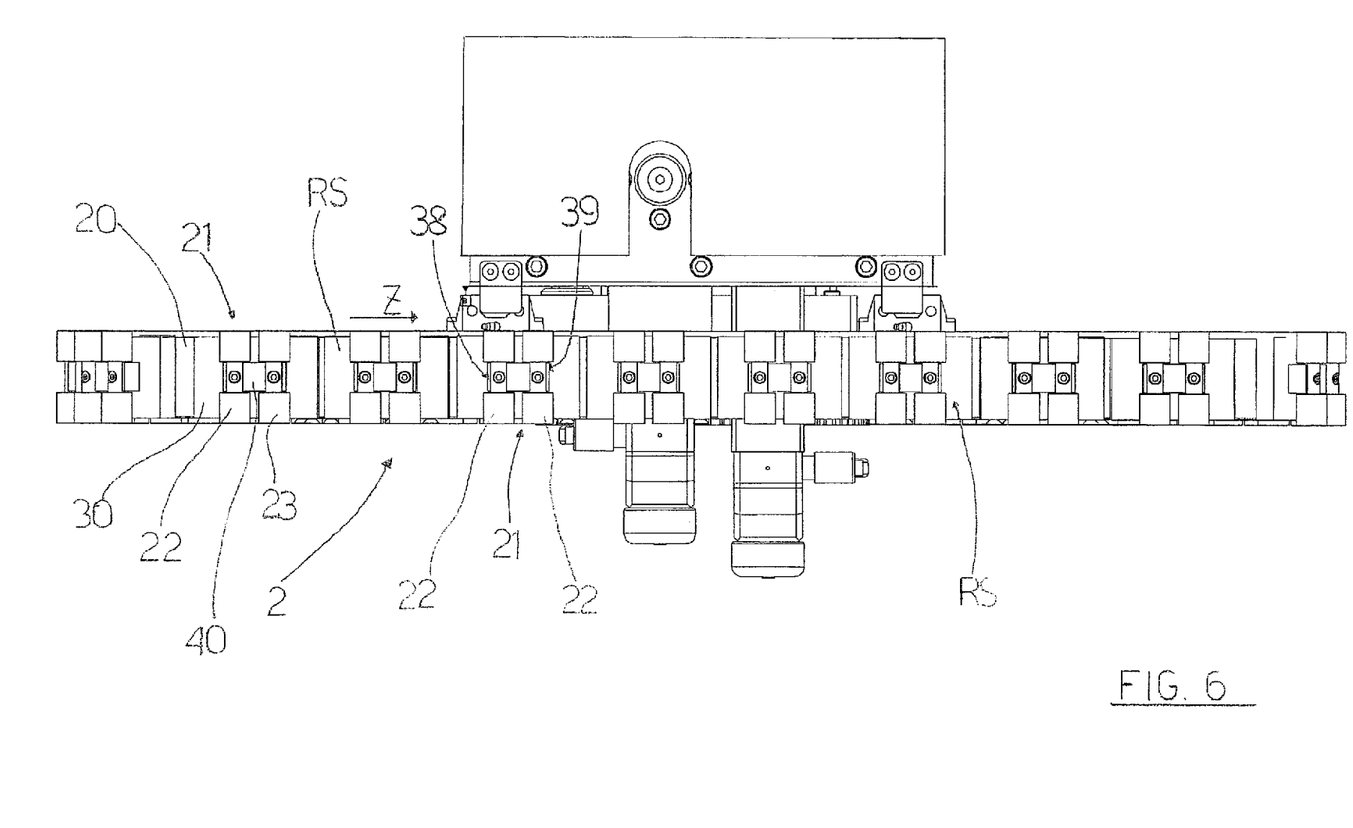
FIG. 6 is a plan view of the component of FIG. 5.

In a further advantageous aspect, the rollers (22, 23) of the pairs (21) of rollers which are mounted on the belt movement member (20) can be conformed in such a way as to comprise a lateral surface that is continuous or has one or more cavities (38, 39) (see for example FIG. 6).

This aspect can be particularly advantageous in a case in which the products to be labelled do not have a completely cylindrical lateral surface, but include sliding parts or additional elements associated to the product, such as for example can occur with some sorts of lipstick, mascara, or insulin pens.

The first conveyor means (1) can be realised in such a way as to comprise a pair of loop-wound belt conveyor members (16, 17) which are arranged parallel to one another and are mutually spaced in such a way that the above-mentioned free space (S) is defined between them, and which are activatable in synchrony, each of the belt conveyor members (16, 17) being predisposed for supporting and transporting the support members (12, 13) of each pair (11) of support members.

In particular, the first conveyor means (1) is configured so that the distance between the pair of belt conveyor members (16, 17) can be regulated and varied so as to regulate and vary the distance between the support members (12, 13) of each pair (11) of support members so that the support members can restingly receive and support cylindrical products having different lengths.

The invention claimed is:

1. A transport system of cylindrical products to be labelled, for transporting the products and for causing the products to transit at a device for applying labels which comprises supply means for supplying and applying a label on the products and abutting means for abutting the products on which the label has been applied, characterised in that it comprises a first conveyor means and a second conveyor means, wherein:

the first conveyor means comprises pairs of support members for supporting the cylindrical products to be labelled and is predisposed and configured so as to have a conveyor portion along which the pairs of support members are moved according to an advancement direction so as to cause the pairs of support members to transit at the device for applying labels, the support members of each pair of support members being predisposed parallel to one another and mutually distanced so as to identify a free space between them, and which are conformed in such a way as to have respective V-shaped housings defining a seating for restingly receiving a corresponding cylindrical product to be labelled with the cylindrical product being arranged with the relative axis transversal with respect to the advancement direction so that the product transits with the cylindrical lateral surface thereof, or a portion of cylindrical lateral surface, below the device for applying the labels so that the supply means can supply and apply a label on a part of the cylindrical lateral surface or a portion of cylindrical lateral surface, the second conveyor means is a looped conveyor means having an upper branch and is arranged with respect to the first conveyor means in such a way that the upper branch is situated at the free space present between the pairs of support members and positioned below the abutting means of the device for applying the labels, the second conveyor means comprising pairs of idle rollers and being activatable in such a way that the pairs of idle rollers are movable along the upper branch according to a movement direction in the advancement direction of the pairs of support members and with the relative axis arranged transversally to the movement direction and so that each pair of idle rollers is interposed with each pair of the support members and advances in synchrony therewith, the upper branch of the second conveyor means having an ascending portion that is conformed with respect to the conveyor portion of the first conveyor means in such a way that the rollers of the pairs of rollers moving along the ascending portion can abut the products transported by the pairs of the support members, on which the label has been applied, and can raise the products from the housings of the support members so that the products are supported only by the rollers when they transit at the abutting means of the device for applying the labels so that the products, when abutting the abutting means, can rotate about the relative axes and the label can be folded and adhered to the cylindrical lateral surface, or portion of cylindrical lateral surface, of the products.

2. The transport system of claim 1, wherein the upper branch of the second conveyor means further has a straight portion arranged consecutively to the ascending portion, which straight portion having an extension at most equal to the extension of the abutting means of the device for applying the labels, and a descending portion consecutive to the straight portion which is conformed with respect to the conveyor portion of the first conveyor means in such a way that the rollers of the pairs of rollers moving along the descending portion can return the products on which the label has been applied and folded to rest in the housings of the support members.

3. The transport system of claim 1, wherein the second conveyor means comprises a belt movement member loop-wound on relative pulleys, of which at least one pulley is a drive pulley, the pairs of idle rollers being mounted on respective support frames and the second conveyor means comprising rapid engaging/disengaging members predisposed on the belt and configured for engaging and disengaging the support frames of the pairs of idle rollers so as to enable mounting pairs of rollers on the belt having different interaxes with respect to one another.

4. The transport system of claim 3, wherein the rollers of the pairs of rollers which are mounted on the belt movement member comprise a lateral surface that is continuous or has one or more cavities.

5. The transport system of claim 1, wherein the first conveyor means comprises a pair of loop-wound belt conveyor members which are arranged parallel to one another and are mutually spaced in such a way that the abovementioned free space is defined between them, and which are activatable in synchrony, each of the belt conveyor members being predisposed for supporting and transporting the support members of each pair of support members.

6. The transport system of claim 5, wherein the first conveyor means is configured so that the distance between the pair of belt conveyor members can be regulated and varied so as to regulate and vary the distance between the support members of each pair of support members so that the support members can restingly receive and support cylindrical products having different lengths.

\* \* \* \* \*